(12) United States Patent
Hasegawa et al.

(10) Patent No.: US 7,152,789 B2
(45) Date of Patent: Dec. 26, 2006

(54) COMMODITY INFORMATION PROVISION METHOD AND APPARATUS

(75) Inventors: Takahiro Hasegawa, Kawasaki (JP); Tomohisa Misawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 113 days.

(21) Appl. No.: 10/920,714

(22) Filed: Aug. 18, 2004

(65) Prior Publication Data

US 2005/0218217 A1    Oct. 6, 2005

(30) Foreign Application Priority Data

Mar. 31, 2004 (JP) ............................. 2004-103024

(51) Int. Cl.
*G06K 15/00* (2006.01)
(52) U.S. Cl. .................. 235/383; 235/375; 700/13
(58) Field of Classification Search ............... 235/383, 235/375; 700/13, 213; 705/14, 27
See application file for complete search history.

(56) References Cited

U.S. PATENT DOCUMENTS

| | | | |
|---|---|---|---|
| 6,386,450 B1 * | 5/2002 | Ogasawara | 235/383 |
| 6,584,375 B1 * | 6/2003 | Bancroft et al. | 700/213 |
| 6,587,835 B1 * | 7/2003 | Treyz et al. | 705/14 |
| 2002/0178085 A1 * | 11/2002 | Sorensen | 705/26 |
| 2005/0021561 A1 * | 1/2005 | Noonan | 707/104.1 |

FOREIGN PATENT DOCUMENTS

| | | |
|---|---|---|
| JP | 2002-304671 | 10/2002 |
| JP | 2002-304671 A | 10/2002 |
| JP | 2003-82300 | 3/2003 |
| JP | 2004-288108 | 10/2004 |

OTHER PUBLICATIONS

Microsoft, "Windows 2000 Solution Guide", Sep. 2001 (in Japanese with partial English translation).

* cited by examiner

*Primary Examiner*—Daniel Stcyr
*Assistant Examiner*—Daniel A. Hess
(74) *Attorney, Agent, or Firm*—Greer, Burns & Crain, Ltd

(57) ABSTRACT

A commodity information provision method for detecting a customer in a store who is in trouble and for providing such a customer with information about an appropriate commodity. A position detection device which the customer carries when shopping transmits position information indicative of current position, and customer position information acquiring unit periodically acquires the position information from the position detection device. Stop judging unit judges whether the customer has stopped or not in accordance with the position information. When the customer is at a stop, message determining unit determines a guidance message to be presented to the customer in accordance with a commodity displayed on a rack near the stop position, and message transmitting unit transmits the determined guidance message to the position detection device.

7 Claims, 27 Drawing Sheets

111 INDIVIDUAL PURCHASE HISTORY

| Customer Code | Purchase Date 1 | Purchased Commodity Code 1 | ...... | Purchased Commodity Code n | E-mail Address |
|---|---|---|---|---|---|
| HT20040218 | 20040217 | 100111102 | ...... | 219000128 | aaa@xxx.com |
| .. | .. | .. | ...... | .. | |
| SM00100001 | 20040221 | 100111102 | ...... | 219000222 | |

112 RACK NO. DB

| Floor Code | Rack No. | Special Sale Flag | Displayed Commodity Code | Previously Displayed Commodity Code | Special Sale Flag | New Floor Code | New Rack No. |
|---|---|---|---|---|---|---|---|
| A001 | AA10011 | 1 (special sale) | 100112325 | 200112325 | 0 (regular sale) | B001 | BA10021 |
| .. | .. | .. | .. | .. | .. | .. | .. |
| B001 | AA10022 | 0 (regular sale) | 100114478 | 200114478 | 1 (special sale) | B001 | BA10031 |

FIG. 11

114 COMPARISON DB

| Floor Code | Rack No. | Commodity Code | Sale Promotion Rank | Commodity Name | Similar Commodity Rack No. | Similar Commodity Code | Similar Commodity Name | Similar Commodity Sale Promotion Rank |
|---|---|---|---|---|---|---|---|---|
| A001 | AA10011 | 100112325 | B | beef | BB10011 | 210112325 | pork | B |
| A001 | AA10021 | 200112325 | A | beef (from Australia) | BB10031 | 330112325 | pork (from Australia) | A |
| A001 | AA10031 | 300112325 | C | beef (from U.S.A.) | — | — | — | — |

115 EAT-AND-COMPARE DB

| Rack No. | Commodity Code | Commodity Name | Commodity Class Code | Commodity Class Name | Old/New Grouping |
|---|---|---|---|---|---|
| AA10011 | 100112325 | beef (home-produced) | G001 | beef | 1 (existing) |
| AA10011 | 200112325 | beef (from Australia) | G001 | beef | 1 (existing) |
| BB10011 | 300112325 | cup-type instant noodle (A company) | F004 | noodle | 1 (existing) |
| BB10011 | 400112325 | cup-type instant noodle (A company) | F004 | noodle | 2 (new commodity) |

FIG. 12

116 RECOMMENDATION DB

| Rack No. | Commodity Code | Recommendation Rank | No. in Stock | Information Presentability |
|---|---|---|---|---|
| AA10011 | 100112325 | B | 0 | 2 (not presentable) |
| AA10021 | 200112325 | A | 10 | 1 (presentable) |
| AA10031 | 300112325 | C | 5 | 1 (presentable) |

FIG. 13

117 USE INFORMATION DB

| Customer Code | Use Start Time | Set Time (seconds) | Set Count | Passed Rack No. | Rack Passage Time | Stayed Rack No. | Stop Time (seconds) | Stop Count | Payment Flag |
|---|---|---|---|---|---|---|---|---|---|
| HT20040218 | 14:00 | 9 | 2 | 300112325 | 14:21 | AA10011 | 10 | 1 | |
| | | | | | | AA10011 | 10 | 1 | 0 |
| ... | ... | ... | ... | ... | ... | ... | ... | ... | ... |

FIG. 14

118 GUIDANCE MESSAGE DB

| Message Type | Contents of Message |
|---|---|
| New Rack No. Notification | The (Commodity Name) section has been removed to the following: New Floor: (Floor Code); New Rack No.: (Rack No.); Commodity Code: (Commodity Code) |
| ⋮ | ⋮ |

FIG. 15

41  CUSTOMER CODE NOTIFICATION SCREEN

This is to inform you of your customer code.

Customer Code:HT20040218

Issue Date: February 25, 2004

This code is important because it is required when you exercise various privileges during shopping at this store.
Please enter the code when you shop at this store next time.

FIG. 17

42  SALE SUSPENSION INFORMATION DISPLAY SCREEN

Really very sorry!
The sale of U.S. beef has been suspended on and after January 31, 2004.

FIG. 19

SUBSTITUTE COMMODITY
INFORMATION DISPLAY SCREEN

43

Privilege Information for our Customer

Customer Code:HT20040218

We make you a special offer. Australian beef for sale at ¥100 per 100 g will be offered at ¥80 per 100g.

Rack No. =AA10021

FIG. 20

PROMOTED COMMODITY INFORMATION SCREEN

44

Privilege Information for our Customer

Customer Code:HT20040218

Our store has started selling Australian beef.

We make you a special offer. Australian beef for sale at ¥100 per 100 g will be offered at ¥80 per 100g.

Rack No. =AA10021

FIG. 22

45 EAT-AND-COMPARE INFORMATION SCREEN

Privilege Information for our Customer

Customer Code:HT20040218

Eat-and-compare Information
Recipe for Grilled Beef
・Cabbage (50 g)
・Onion (1/2)
・Beef (200 g)

Eat-and-compare Privilege
If you buy both home-produced beef and Australian beef, a discount of ¥100 per 200 g will be offered.

FIG. 23

46 RECOMMENDATION INFORMATION DISPLAY SCREEN

Privilege Information for our Customer

Customer Code:HT20040218

We recommend Australian beef.
Low calorie, high protein.

We make you a special offer. Australian beef for sale at ¥100 per 100 g will be offered at ¥80 per 100g.

Rack No. =AA10021

FIG. 24

47  NEW RACK NO. DISPLAY SCREEN

Display Rack Removal Information

The Australian beef section has been removed to the following:

New Floor:B001
New Rack No.:AA10021
Commodity Code:200112325

FIG. 26

48  SALE COMMODITY'S NEW
RACK NO. DISPLAY SCREEN

Display Rack Removal Information

The special sale section for Australian beef has been removed to the following:

New Floor:B001
New Rack No.:AA10021
Commodity Code:200112325

FIG. 27

COMMODITY INFORMATION PROVISION METHOD AND APPARATUS

CROSS-REFERENCE TO RELATED APPLICATIONS

This application is based upon and claims the benefits of priority from the prior Japanese Patent Application No. 2004-103024, filed on Mar. 31, 2004, the entire contents of which are incorporated herein by reference.

BACKGROUND OF THE INVENTION (1) Field of the Invention

The present invention relates to a commodity information provision method, and more particularly, to a commodity information provision method for providing incoming customers with commodity information.

(2) Description of the Related Art

When shopping at a supermarket, one often uses a shopping cart. An ordinary shopping cart is used simply to carry commodities, but by equipping a shopping cart with a mobile information/position detection device, it is possible to provide customers with a variety of information.

For example, the device may be used to display a total amount of commodities as the customer makes the commodities read by a barcode reader attached to the shopping cart. Also, the device may be used to display an advertisement of a loss leader in accordance with the position of the shopping cart. In this case, advertisement information may be registered in association with a specific time so as to provide information about a special offer at the specified time (see Japanese Unexamined Patent Publication No. 2002-304671, for example).

Meanwhile, in supermarkets, the locations for displaying commodities are occasionally changed. On such occasions, a customer who once purchased a certain commodity will look for the commodity in front of a display rack where the commodity had been displayed before, spending much time in finding the commodity. If the customer cannot find the commodity and gives up buying same (e.g., if the customer decides to buy the commodity at a different store), then the supermarket loses the opportunity for sale.

With the conventional technique, however, it is not possible to notify the customer of the location of a commodity when he/she is at a loss, not knowing the location where the commodity is displayed. It is generally difficult for clerks to watch all customers in the supermarket to judge whether the customers have trouble in doing something. Accordingly, there has been a demand for a system capable of automatically judging whether individual customers have difficulty and presenting necessary information to the customers.

SUMMARY OF THE INVENTION

The present invention was created in view of the above circumstances, and an object thereof is to provide a commodity information provision method capable of detecting a customer in a store who is in trouble and providing such a customer with information on appropriate commodities.

To achieve the object, there is provided a commodity information provision method for providing a customer with commodity information. The commodity information provision method comprises of: periodically acquiring, by customer position information acquiring unit, position information from a position detection device which the customer carries when shopping; judging by stop judging unit whether the customer has stopped or not in accordance with the position information; determining, by message determining unit in response to a stop of the customer, a guidance message to be presented to the customer in accordance with a commodity displayed on a rack near the stop position; and transmitting, by message transmitting unit, the determined guidance message to the position detection device.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a diagram illustrating an exemplary data structure of an individual purchase history;

FIG. 9 is a diagram illustrating an exemplary data structure of a rack number DB;

FIG. 11 is a diagram illustrating an exemplary data structure of a comparison DB;

FIG. 12 is a diagram illustrating an exemplary data structure of an eat-and-compare DB;

FIG. 13 is a diagram illustrating an exemplary data structure of a recommendation DB;

FIG. 14 is a diagram illustrating an exemplary data structure of a use information DB;

FIG. 15 is a diagram illustrating an example of a guidance message DB;

FIG. 17 is a diagram showing an exemplary display of a customer code notification screen;

FIG. 19 is a diagram showing an example of a sale suspension information display screen;

FIG. 20 is a diagram showing an example of a substitute commodity information display screen;

FIG. 22 is a diagram showing an example of a promoted commodity information screen;

FIG. 23 is a diagram showing an example of an eat-and-compare information screen;

FIG. 24 is a diagram showing an example of a recommendation information display screen;

FIG. 26 is a diagram showing an example of a new rack number display screen; and FIG. 27 is a diagram showing an example of a sale commodity's new rack number display screen.

DESCRIPTION OF THE PREFERRED EMBODIMENTS

An embodiment of the present invention will be hereinafter described with reference to the drawings.

First, the invention applied to the embodiment will be outlined, and then the embodiment will be described in detail.

Figure 1:
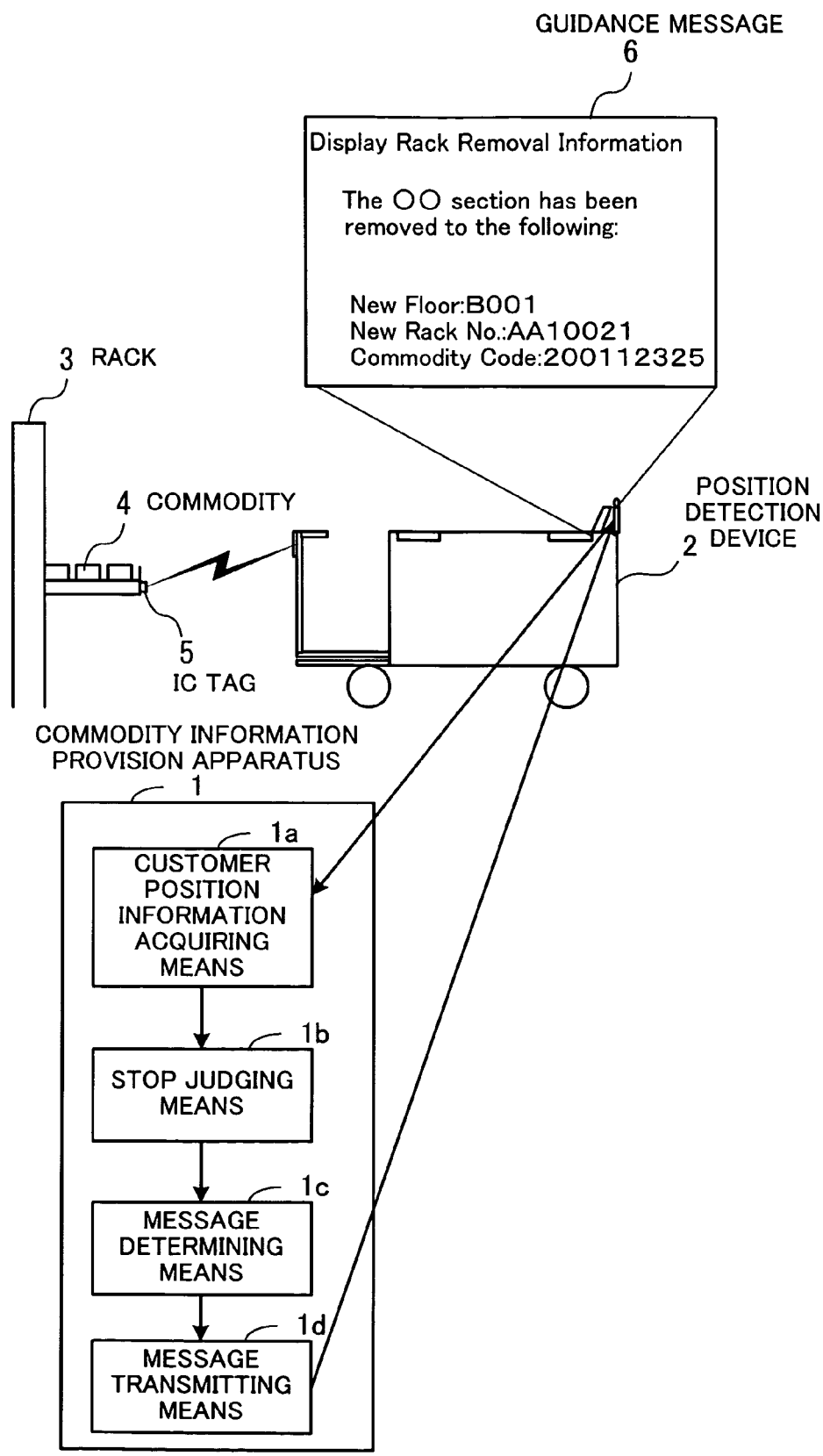
FIG. 1 is a conceptual diagram of the invention applied to an embodiment.

FIG. 1 is a conceptual diagram of the invention applied to the embodiment. A commodity information provision apparatus 1 comprises customer position information acquiring means 1a, stop judging means 1b, message determining means 1c, and message transmitting means 1d.

The customer position information acquiring means 1a periodically acquires position information from a position detection device 2 which a customer carries when shopping. The position detection device 2 is, for example, a commodity carrying device (shopping cart or shopping basket). For the position information, position information indicative of a rack 3 on which commodities 4 are displayed may be used. In this case, the position detection device 2 reads identification information of the rack 3 from an IC tag 5 attached to the rack 3. Then, the identification information of the rack 3 is transmitted from the position detection device 2 to the customer position information acquiring means 1a. The customer position information acquiring means 1a previously holds information about the position of the rack 3 and, when supplied with the identification information of the rack 3 from the position detection device 2, judges that the customer is near the rack 3.

The stop judging means 1b judges whether the customer has stopped or not (at the same place for a predetermined time) on the basis of the position information. For example, if the position information remains unchanged for a predetermined time, the stop judging means 1b judges that the customer has stopped.

When the customer is at a stop, the message determining means 1c determines a guidance message to be presented to the customer, in accordance with the commodity 4 displayed on the rack 3 near the stop position. For example, the message determining means 1c determines, as the guidance message, information indicating a new rack for the commodity which was previously displayed on the rack 3. Also, if the customer passes by and stops in front of the rack 3 several times, the message determining means 1c may determine, as the guidance message, information that the commodity 4 is sold at a lower price than usual, on the assumption that the customer is in two minds whether to buy the commodity 4 displayed on the rack 3. The message transmitting means 1d transmits the determined guidance message to the position detection device 2.

With the system described above, when the customer carrying the position detection device 2 approaches the rack 3, the position information is transmitted from the position detection device 2 to the customer position information acquiring means 1a. If the customer stays at that position for the predetermined time or more, the position information indicating the position of the rack 3 is transmitted from the position detection device 2 to the customer position information acquiring means 1a. The position information acquired by the customer position information acquiring means 1a is sent to the stop judging means 1b.

Thereupon, the stop judging means 1b judges whether the customer has stopped or not on the basis of the position information. If the same position information is continually received over the predetermined time or more, it is judged that the customer has stopped. When the customer is at a stop, the message determining means 1c determines a guidance message to be presented to the customer, in accordance with the commodity 4 displayed on the rack 3 near the stop position. Then, the message transmitting means 1d transmits the determined guidance message to the position detection device 2, whereby the guidance message 6 is displayed at the position detection device 2. By checking the guidance message 6, the customer can remove the cause of his/her trouble. For example, the customer can be informed of the new location of the commodity which was displayed on the rack 3 before.

In this manner, when the customer is at a stop, it is inferred that the customer is in trouble because of shortage of information about the commodity on the rack near the stop position, so that a guidance message about the commodity currently or previously displayed on the rack can be presented to the customer. As a result, the customer can very possibly obtain the necessary information without the need to intentionally input his/her demand, thus promoting the customer's convenience. Moreover, the store does not lose the opportunity of selling the commodity which the customer is considering purchasing.

The message determining means 1c may be adapted to count the number of times the customer stops at the same position and to determine a guidance message in accordance with the stop count.

Also, the message determining means 1c may look up a substitute commodity database in which are registered substitutes for commodities of which the sale is suspended, to determine information indicative of such a substitute commodity as the guidance message if the sale of the commodity which was displayed on the rack near the customer's stop position is currently suspended.

Further, the message determining means 1c may look up an eat-and-compare database in which are registered the relations between new commodities and other commodities which customers are recommended to eat and compare, to determine information suggesting eating and comparing, as the guidance message, if such a new commodity is displayed on the rack near the customer's stop position.

Furthermore, the message determining means 1c may look up a recommendation database in which are registered the commodities that the store recommends customers to purchase, to determine, as the guidance message, information suggesting eating and comparing a plurality of commodities displayed on the rack near the customer's stop position.

The embodiment of the present invention will be now described in detail.

Figure 2:
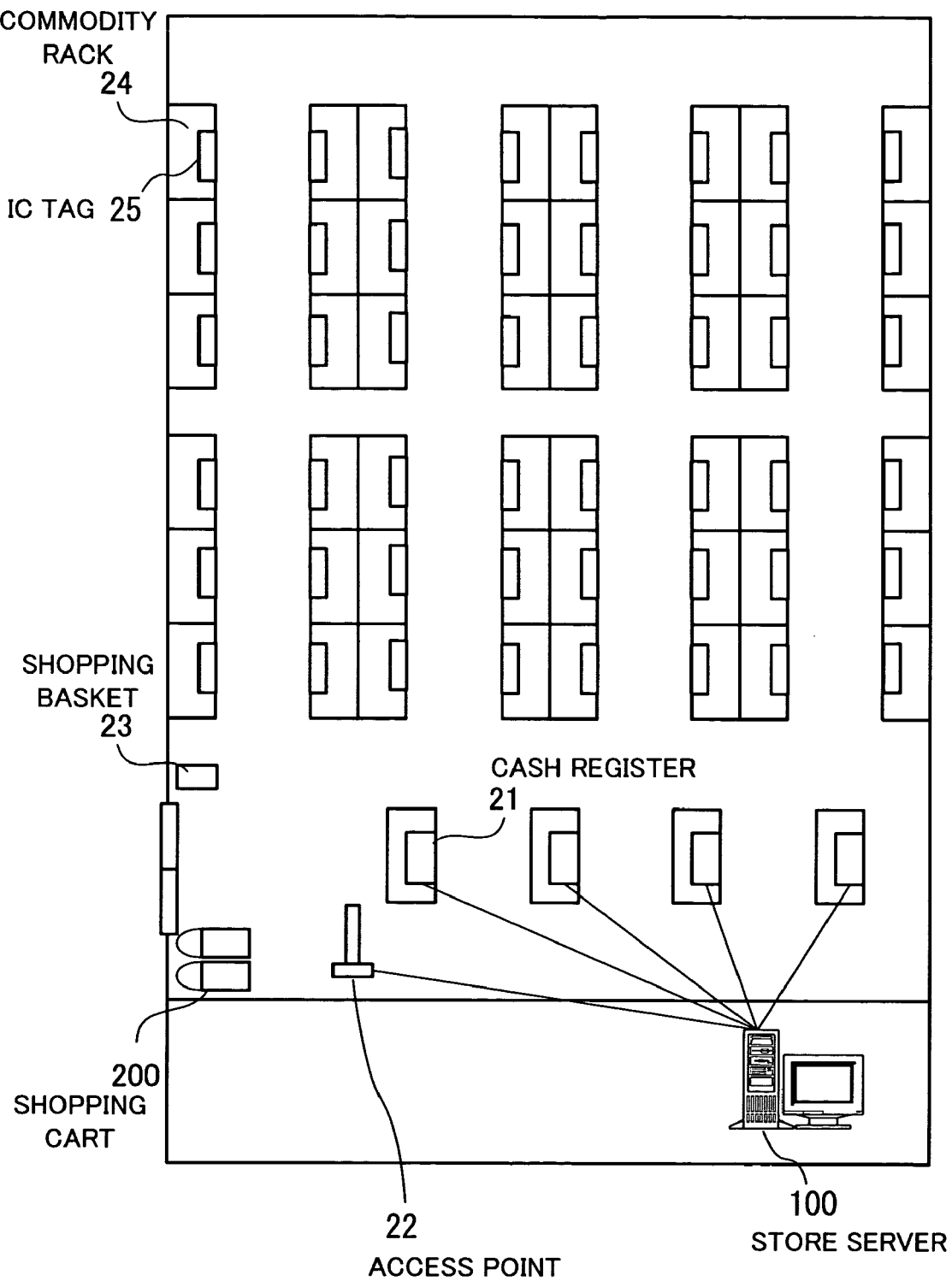
FIG. 2 is a diagram showing a supermarket to which is introduced a system according to the embodiment of the present invention.

FIG. 2 illustrates a supermarket to which is introduced the system according to the embodiment of the present invention. A store server 100 is installed in the supermarket and is connected with cash registers 21 through a network. Each cash register 21 functions as a POS (Point Of Sale) terminal.

Also, the store server 100 is connected through the network with an access point 22 of a wireless LAN (Local Area Network). Although a single access point is illustrated, there are provided a plurality of access points 22 so as to permit communication within the entire internal area of the store.

Shopping carts 200 and shopping baskets 23 are placed near the entrance of the supermarket. Customers are free to use the shopping carts 200 and the shopping baskets 23. The shopping carts 200 and the shopping baskets 23 each function as a mobile position detection device connectible with the wireless LAN. Each of the shopping carts 200 is further provided with an IC tag reader capable of reading information recorded on IC tags within a predetermined range.

Each of commodity racks 24 is provided with an IC tag 25. On the IC tag 25 is recorded information indicating at least the position of the corresponding commodity rack 24. Namely, the information of the IC tag 25 is read by the IC tag reader attached to the shopping cart 200, whereupon the current position of the shopping cart 200 can be specified.

Figure 3:
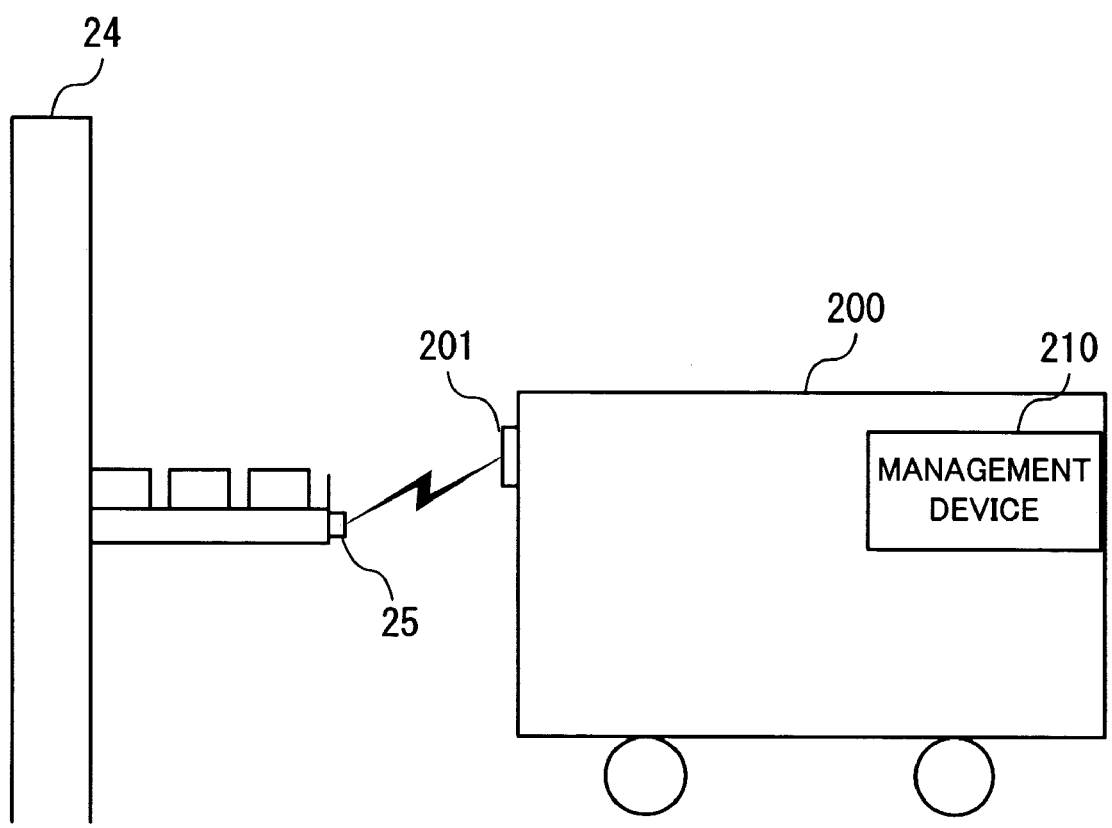
FIG. 3 is a conceptual diagram illustrating reading of information from an IC tag.

FIG. 3 is a conceptual diagram illustrating reading of information from an IC tag. When the shopping cart 200 approaches and enters the predetermined range from the IC tag 25 attached to the commodity rack 24, the information recorded on the IC tag 25 is read by the IC tag reader 201. The thus-read information is sent to a management device 210 provided in the shopping cart 200. The information of the IC tag 25 is then transmitted from the management device 210 to the store server 100 through the wireless LAN, and the store server 100 sends back information matching the position of the shopping cart 200.

The following describes exemplary hardware configurations for transmitting/receiving such information.

Figure 4:
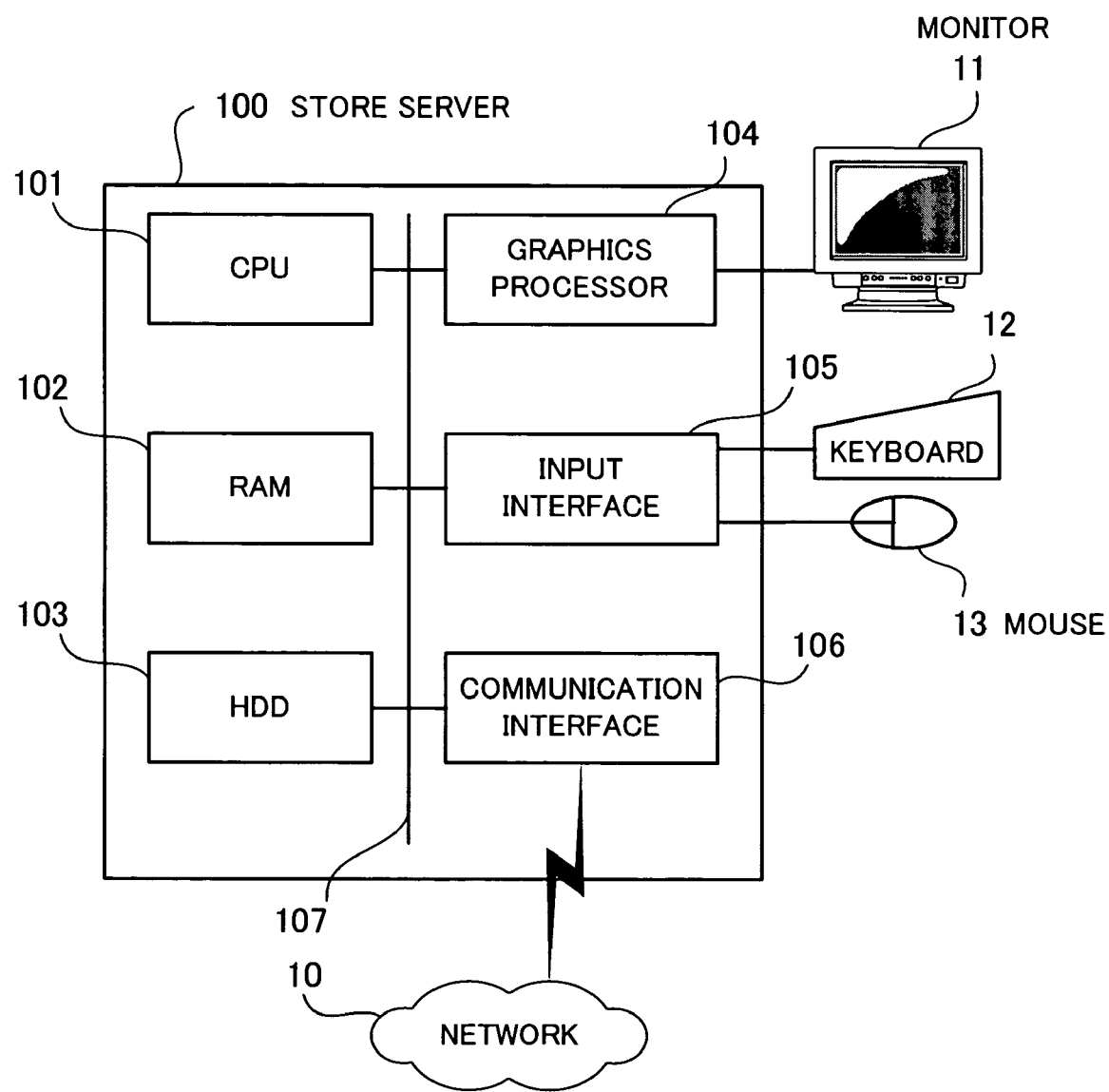
FIG. 4 is a diagram showing an exemplary hardware configuration of a store server.

FIG. 4 illustrates an exemplary hardware configuration of the store server. The store server 100 is in its entirety under the control of a CPU (Central Processing Unit) 101. The CPU 101 is connected through a bus 107 with a RAM (Random Access Memory) 102, a hard disk drive (HDD) 103, a graphics processor 104, an input interface 105, and a communication interface 106.

The RAM 102 temporarily stores OS (Operating System) programs and at least part of application programs executed by the CPU 101. Also, the RAM 102 stores various other data necessary for the processing by the CPU 101. The HDD 103 stores the OS and application programs.

The graphics processor 104 is connected with a monitor 11. In accordance with instructions from the CPU 101, the graphics processor 104 causes the monitor 11 to display images on a screen thereof. The input interface 105 is connected with a keyboard 12 and a mouse 13, and sends signals from the keyboard 12 and the mouse 13 to the CPU 101 through the bus 107.

The communication interface 106 is connected to a network 10 and permits the store server to transmit/receive data to/from other computers through the network 10.

Figure 5:
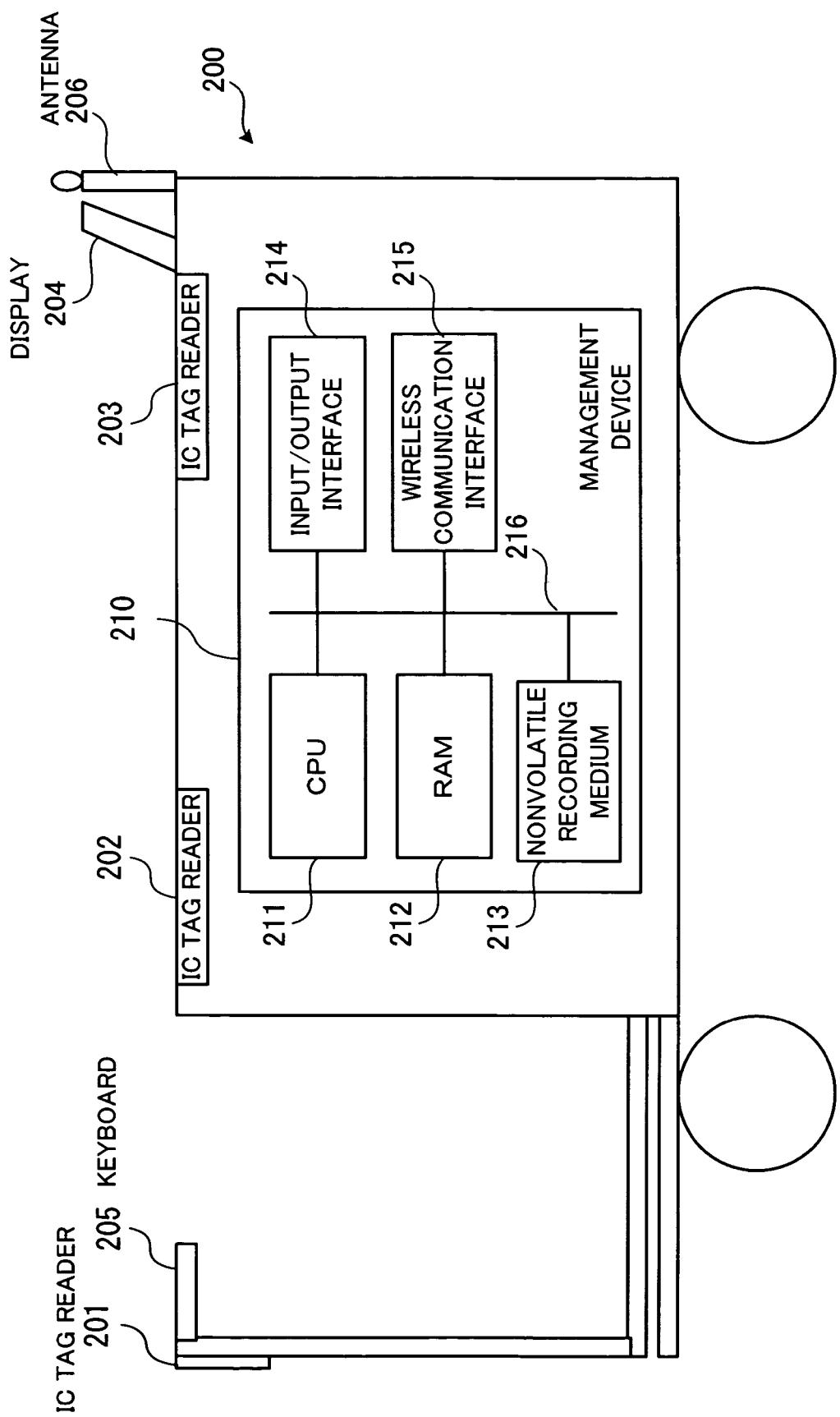
FIG. 5 is a diagram showing an exemplary hardware configuration of a shopping cart.

FIG. 5 illustrates an exemplary hardware configuration of the shopping cart. The shopping cart 200 is equipped with the management device 210, a plurality of IC tag readers 201, 202 and 203, a display 204, a keyboard 205, and an antenna 206.

The management device 210 is in its entirety under the control of a CPU 211. The CPU 211 is connected through a bus 216 with a RAM 212, a nonvolatile recording medium 213, an input/output interface 214, and a wireless communication interface 215.

The RAM 212 temporarily stores at least part of programs executed by the CPU 211. Also, the RAM 212 stores various other data necessary for the processing by the CPU 211. The nonvolatile recording medium 213 is a recording medium such as a flash memory or HDD and stores various data.

The input/output interface 214 is connected with the IC tag readers 201, 202 and 203, the display 204 and the keyboard 205 (in the figure, lines indicating the connections are omitted). The input/output interface 214 sends signals from the IC tag readers 201, 202 and 203 and the keyboard 205 to the CPU 211 through the bus 216. Also, the input/output interface 214 sends signals from the CPU 211 to the display 204. The wireless communication interface 215 is connected with the antenna 206 (in the figure, a line indicating the connection is omitted). The wireless communication interface 215 communicates with the access points 22 through the antenna 206, thereby communicating information via the wireless LAN.

The processing functions of this embodiment can be performed by the hardware configurations described above. In the following, the processing functions of the store server 100 and shopping cart 200 will be described.

Figure 6:
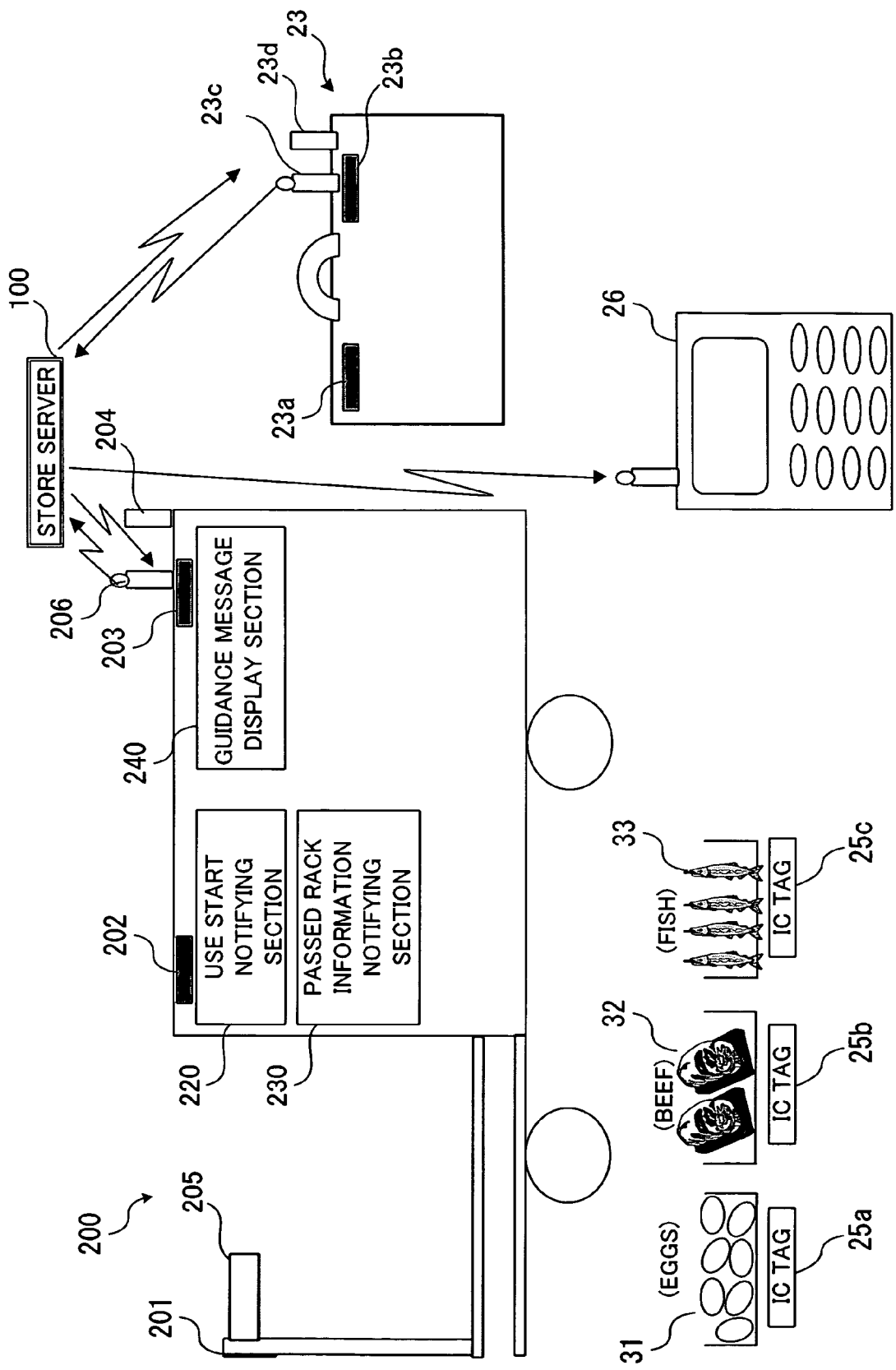
FIG. 6 is a diagram illustrating an information transmitting/receiving function of the shopping cart.

FIG. 6 illustrates the information transmitting/receiving function of the shopping cart. The shopping cart 200 includes a use start notifying section 220, a passed rack information notifying section 230, and a guidance message display section 240.

The use start notifying section 220 detects the start of use of the shopping cart 200 by a customer and notifies the store server 100 of the start of use. For example, when the power of the management device 210 is turned on, the use start notifying section 220 judges that the use of the shopping cart has been started. Also, at the start of use, the use start notifying section 220 displays a customer code input screen on the display 204. The customer enters his/her customer code by using the keyboard 205, whereupon the use start notifying section 220 transmits the customer code to the store server 100.

The passed rack information notifying section 230 periodically searches for nearby IC tags through the IC tag readers 201, 202 and 203. On finding an IC tag, the passed rack information notifying section 230 reads information registered in the IC tag and indicative of the position of the commodity rack. Then, the passed rack information notifying section 230 transmits the read information to the store server 100. This permits the store server 100 to recognize the position of the shopping cart 200.

Let it be assumed, for example, that there are commodity racks 31, 32 and 33 on which eggs, beef and fish are displayed, respectively, and which are affixed respectively with IC tags 25a, 25b and 25c. The IC tag 25a has registered therein information indicating the position of the commodity rack 31 on which eggs are displayed. The IC tag 25b has registered therein information indicating the position of the commodity rack 32 on which beef is displayed, and the IC tag 25c has registered therein information indicating the position of the commodity rack 33 on which fish is displayed.

When the shopping cart 200 is moved to a position in front of the commodity rack 32, the passed rack information notifying section 230 reads the information recorded on the IC tag 25b and transmits the information to the store server 100. The store server 100 analyzes the received information and recognizes that the shopping cart 200 has been moved to a position in front of the rack 32.

The guidance message display section 240 causes the display 204 to display a guidance message transmitted from the store server 100.

The shopping basket 23 also has the same function as that of the shopping cart 200. Specifically, the shopping basket 23 is provided with a plurality of IC tag readers 23a and 23b, an antenna 23c, a display 23d, etc. and can perform the same process as that carried out by the shopping cart 200.

It is also possible to transmit a guidance message from the store server 100 to a cellular phone 26 carried by the customer to have the guidance message displayed on the cellular phone 26. In this case, to allow electronic mail to be transmitted to the customer's cellular phone 26, the e-mail address of the cellular phone needs to be registered beforehand in the store server 100.

Figure 7:
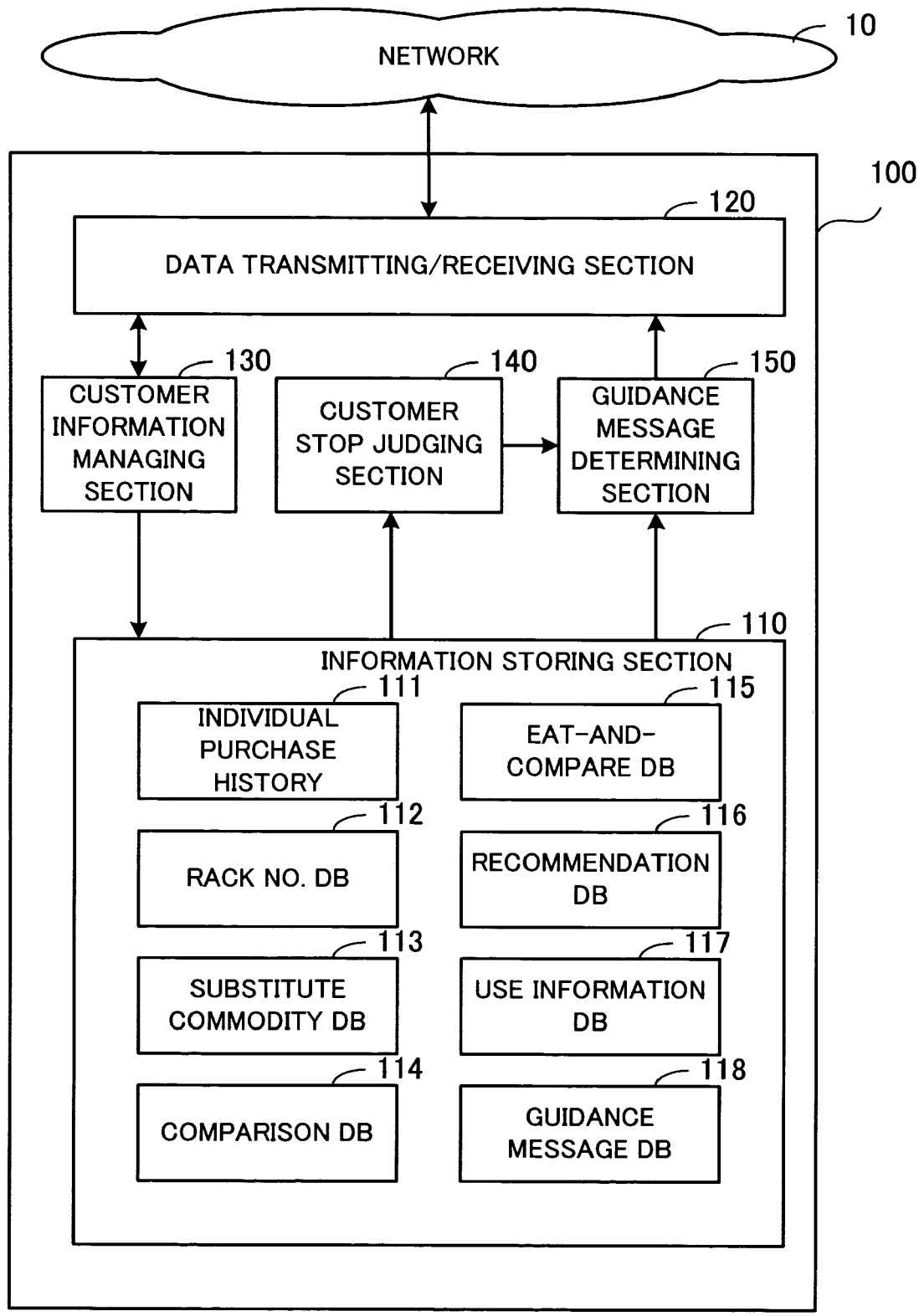
FIG. 7 is a diagram illustrating processing functions of the store server.

FIG. 7 illustrates the processing functions of the store server. The store server 100 includes an information storing section 110, a data transmitting/receiving section 120, a customer information managing section 130, a customer stop judging section 140, and a guidance message determining section 150.

In the information storing section 110 is stored information necessary to provide customers with appropriate guidance messages. Specifically, the information storing section 110 holds an individual purchase history 111, a rack number database (DB) 112, a substitute commodity DB 113, a comparison DB 114, an eat-and-compare DB 115, a recommendation DB 116, a use information DB 117, and a guidance message DB 118.

The individual purchase history 111 has customers' personal information registered therein. In the rack number DB 112, information about commodities currently displayed on the respective racks, commodities previously displayed on the respective racks and new locations thereof, etc. is registered. In the substitute commodity DB 113 is registered information about substitutes for commodities the sale of which has been suspended, and in the comparison DB 114 is registered information about similar commodities which are recommended to customers who are in two minds about purchase. In the eat-and-compare DB 115 is registered information about commodities which customers are recommended to eat and compare, and in the recommendation DB 116 is registered information about commodities of which the sale is particularly promoted. In the use information DB 117 is registered information about customers' behavior, and in the guidance message DB 118 is registered guidance messages to be displayed at the shopping cart 200.

The data transmitting/receiving section 120 communicates with the management device of the shopping cart 200 or shopping basket 23 through the network 10. The data transmitting/receiving section 120 transfers information received from the shopping cart 200 to the customer information managing section 130 and also transmits information received from the guidance message determining section 150 to the shopping cart 200.

The customer information managing section 130 updates the use information DB 117 on the basis of information about customers received from the data transmitting/receiving section 120. Specifically, on receiving the customer code of a customer who newly entered the store, the customer information managing section 130 registers the customer code in the use information DB 117 as a new record. Also, when the shopping cart 200 is moved without a customer code being entered, the customer information managing section 130 determines a customer code for the customer using the shopping cart 200 and registers the customer code in the use information DB 117 as a new record. The customer code thus determined is transmitted to the shopping cart 200 via the data transmitting/receiving section 120.

Further, on receiving a passed rack number from the shopping cart 200, the customer information managing section 130 updates the contents of the use information DB 117. Specifically, the customer information managing section 130 registers the received passed rack number in the use information DB 117. Further, the customer information managing section 130 registers, in the use information DB 117, the time at which the passed rack number was received.

The customer stop judging section 140 looks up the information registered in the use information DB 117 to search for customers who need advice for some reason. For example, a customer who stops at the same place over and over again can be assumed to be in two minds whether to buy the commodity on the rack (i.e., the customer does not have sufficient information to decide whether the commodity is needed or not). In the case where a commodity has been removed from one rack to another, a customer who is familiar with the previous location of the commodity presumably has difficulty in finding the commodity (the customer does not know where the commodity has been removed). On detecting a customer who is in need of advice, the customer stop judging section 140 requests the guidance message determining section 150 to send a guidance message to the customer.

The guidance message determining section 150 specifies the customer's current position by the passed rack number registered in the use information DB 117 and transmits an ordinary guidance message matching the position to the shopping cart 200 used by the customer. Also, on receiving a guidance message send request from the customer stop judging section 140, the guidance message determining section 150 sends a guidance message matching the cause of the customer's trouble to the shopping cart 200 used by the customer.

In the following, data stored in the information storing section 110 will be described in detail.

FIG. 8 illustrates an exemplary data structure of the individual purchase history. The individual purchase history 111 has fields including customer code, one or more purchase dates, one or more purchased commodity codes associated with the respective purchase dates, and e-mail address. Items of information in each row are interrelated and constitute a record.

In the field "Customer Code" is set identification information (customer code) for uniquely identifying a customer. In the field "Purchase Date" is set the date on which the customer purchased the commodity indicated in the neighboring field on the right. In the field "Purchased Commodity Code" is set identification information (commodity code) of the commodity purchased by the customer, and in the field "E-mail Address" is set the electronic mail (e-mail) address of the customer.

The customer code can be set arbitrarily when a customer begins shopping. A customer who entered a customer code in the past may input the same customer code, in which case the customer can receive information matching the trend of commodities which the customer purchased in the past.

A customer may omit entering the customer code. When no customer code is entered, a customer code acquired by the customer information managing section 130 is set anew.

FIG. 9 illustrates an exemplary data structure of the rack number DB. The rack number DB 112 has fields including floor code, rack number, special sale flag for displayed commodity, displayed commodity code, previously displayed commodity code, special sale flag for previously displayed commodity, new floor code, and new rack number. Items of information in each row are interrelated and constitute a record.

In the field "Floor Code" is set identification information (floor code) specifying the floor on which the rack displaying commodities is located. In the field "Rack No." is set identification information of the rack. As the special sale flag for displayed commodity, a flag indicating whether the commodity currently displayed on the rack is a sale commodity or not is set ("1" is set for special sale and "0" for regular sale). In the field "Displayed Commodity Code" is set identification information (commodity code) of the commodity displayed on the rack, and in the field "Previously Displayed Commodity Code" is set identification information (commodity code) of the commodity which had been displayed on the rack before being replaced by the current commodity. In the field "Special Sale Flag" for previously displayed commodity is set a flag indicating whether the commodity which had been displayed on the rack before being replaced by the current commodity is a sale commodity or not ("1" is set for special sale and "0" for regular sale). In the field "New Floor Code" is set identification information (floor code) of the floor where the commodity which had been displayed on the rack before being replaced by the current commodity has been removed, and in the field "New Rack No." is set the rack number of the rack where the commodity which had been displayed on the rack before being replaced by the current commodity has been removed.

In the fields "Previously Displayed Commodity Code", "Special Sale Flag" for previously displayed commodity, "New Floor Code" and "New Rack No.", data (removed commodity information) is set when the commodity displayed on the corresponding rack is replaced by a different one, and is retained for a predetermined period. Specifically, when a commodity has been removed, the system administrator registers removed commodity information etc. in the record in the rack number DB 112 associated with the rack from which the commodity has been removed, and deletes the registered information after a lapse of the predetermined period from the removal.

Figure 10:
FIG. 10 is a diagram illustrating an exemplary data structure of a substitute commodity DB.

FIG. 10 illustrates an exemplary data structure of the substitute commodity DB. The substitute commodity DB 113 has fields including commodity code, sale suspension flag, substitute commodity code, and commodity rack number. Items of information in each row are interrelated and constitute a record.

In the field "Commodity Code" is set the commodity code of a commodity for which another commodity can be substituted. In the field "Sale Suspension Flag" is set a flag indicating whether the sale of the corresponding commodity has been suspended or not ("1" is set for the commodity of which the sale has been suspended, and "0" is set for the commodity which is on sale). In the field "Substitute Commodity Code" is set the commodity code of a commodity which can be presented as a substitute for the corresponding commodity, and in the field "Commodity Rack No." is set the rack number of the substitute commodity.

By looking up the substitute commodity DB 113, it is possible to present a substitute commodity when a customer is looking for a commodity of which the sale has been suspended. In the case where the sale of beef from the U.S.A. has been suspended, for example, beef from Australia can be suggested as a substitute.

FIG. 11 illustrates an exemplary data structure of the comparison DB. The comparison DB 114 has fields including floor code, rack number, commodity code, sale promotion rank, commodity name, similar commodity rack number, similar commodity code, similar commodity name, and similar commodity sale promotion rank. Items of information in each row are interrelated and constitute a record.

In the field "Floor Code" is set identification information (floor code) of the floor where a commodity as an object of comparison is displayed. In the field "Rack No." is set the rack number of the rack on which the commodity for comparison is displayed, and in the field "Commodity Code" is set the commodity code of the commodity for comparison. In the field "Sale Promotion Rank" is set a rank indicating the degree to which the sale of the commodity for comparison is promoted ("A" is set for a commodity of which the sale is promoted most, and "B" and "C" are set for commodities of which the degrees of sale promotion are the second and third highest, respectively). In the field "Commodity Name" is set the name of the commodity for comparison. In the field "Similar Commodity Rack No." is set the rack number of a commodity similar to the commodity for comparison, and in the field "Similar Commodity Code" is set the commodity code of the similar commodity. In the field "Similar Commodity Name" is set the name of the similar commodity, and in the field "Similar Commodity Sale Promotion Rank" is set a rank indicating the degree to which the sale of the similar commodity is promoted ("A" is set for a commodity of which the sale is promoted most, and "B" and "C" are set for commodities of which the degrees of sale promotion are the second and third highest, respectively).

By looking up the comparison DB 114, it is possible to inform a customer who is in two minds whether to buy a certain commodity that there is a similar commodity available. For example, a customer who is considering buying beef can be informed that pork is also available.

FIG. 12 illustrates an exemplary data structure of the eat-and-compare DB. The eat-and-compare DB 115 has fields including rack number, commodity code, commodity name, commodity class code, commodity class name, and old/new grouping. Items of information in each row are interrelated and constitute a record.

In the field "Rack No." is set the rack number of a rack displaying an eat-and-compare commodity which is an object for eating and comparison. In the field "Commodity Code" is set the commodity code of the eat-and-compare commodity. In the field "Commodity Class Code" is set the commodity class of the eat-and-compare commodity, and in the field "Commodity Class Name" is set the commodity class name of the eat-and-compare commodity. In the field "Old/New Grouping" is set a value indicating whether the commodity is an existing commodity (1) or a new commodity (2).

By looking up the eat-and-compare DB 115, it is possible to recommend a customer to eat and compare different commodities displayed on the same rack. For example, it is possible to suggest eating and comparing home-produced beef and Australian beef. Also, in the case where a new cup-type instant noodle is put on the market by A company, it is possible to suggest eating and comparing old and new products.

FIG. 13 illustrates an exemplary data structure of the recommendation DB. The recommendation DB 116 has fields including rack number, commodity code, recommendation rank, number in stock, and information presentability. Items of information in each row are interrelated and constitute a record.

In the field "Rack No." is set the rack number of a rack displaying a commodity recommended by the store, and in the field "Commodity Code" is set the commodity code of the recommended commodity. In the field "Recommendation Rank" is set a rank indicating the degree of recommendation of the recommended commodity ("A" is set for the most recommended commodity, and "B" and "C" are set for commodities of which the degrees of recommendation are the second and third highest, respectively). In the field "No. in Stock" is set the number of articles of the corresponding commodity in stock. In the field "Information Presentability" is set a value indicating whether or not the information on the corresponding commodity may be presented to customers ("2" is set if the information should not be presented, and "1" is set if the information may be presented). If the number of articles in stock is "0", for example, the information about the commodity should not be presented.

FIG. 14 illustrates an exemplary data structure of the use information DB. The use information DB 117 has fields including customer code, use start time, set time, set count, passed rack number, rack passage time, stayed rack number, stop time, stop count, and payment flag. Items of information in each row are interrelated and constitute a record.

In the field "Customer Code" is set the customer code of an incoming customer, and in the field "Use Start Time" is set the time at which the incoming customer started to use the shopping cart 200. In the field "Set Time" is set a time period in seconds which is used as a criterion for judging that the customer has stopped in front of a rack (the customer is judged to have stopped if he/she stayed in front of the same rack for more than the set time). In the field "Set Count" is set a count of stops in front of the same rack, which count is used as a criterion for judging that the customer is in two minds whether to buy the commodity. In the field "Passed Rack No." is set the rack number of the latest rack that the customer has passed, and in the field "Rack Passage Time" is set the time at which the customer passed by the rack. In the field "Stayed Rack No." are set the rack numbers of racks where the customer is judged to have stopped after entering the store. In the field "Stop Time" are set time periods in seconds for which the customer stopped in front of the respective racks indicated in the neighboring fields on the left, and in the field "Stop Count" are set the counts of stops which the customer made in front of the racks specified by the respective stayed rack numbers. For the "Payment Flag", a flag indicating whether the customer has paid for the commodities or not is set ("1" is set if the payment is completed, and "0" is set if the payment is not completed).

FIG. 15 illustrates an example of the guidance message DB. The guidance message DB 118 has fields including message type and contents of message. Items of information in each row are interrelated and constitute a record.

In the field "Message Type", the type of message is set, and in the field "Contents of Message", the text of guidance message is set. For the parenthesized portions in the contents of message, necessary information is retrieved from the information storing section 110 and is set in place of the parenthesized portions when the guidance message is actually transmitted.

With the system configuration and databases described above, the store server 100 performs a process explained below. In the instance below, it is assumed that a customer uses the shopping cart 200.

Figure 16:
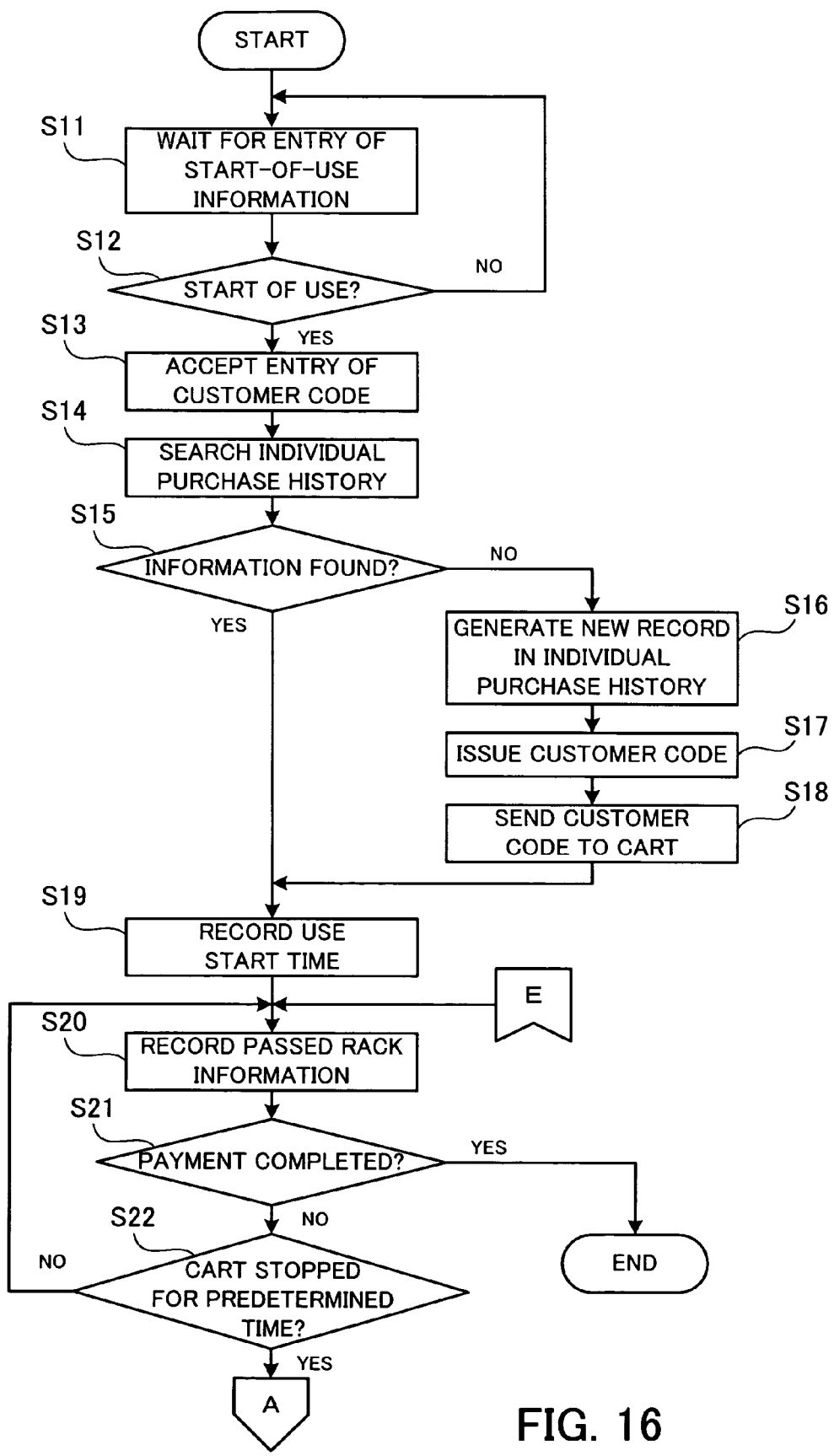
FIG. 16 is a first flowchart illustrating a process of the store server.

FIG. 16 is a first flowchart illustrating the process of the store server. In the following, the process shown in FIG. 16 will be explained in order of step number.

[Step S11] The customer information managing section 130 waits for entry of information indicative of the start of use from the shopping cart 200.

[Step S12] The customer information managing section 130 determines whether or not the use of the shopping cart is started. For example, when the shopping cart 200 has begun to move, the customer information managing section 130 judges that the use of the shopping cart has been started. Start of movement of the shopping cart 200 can be detected by determining, for example, whether or not the shopping cart can detect an IC tag arranged near the place for parking shopping carts. If the use of the shopping cart is started, the process proceeds to Step S13; if not, the process proceeds to Step S11 and waits for entry of the start-of-use information.

[Step S13] The customer information managing section 130 accepts entry of a customer code. Entry of a customer code is optional.

[Step S14] If a customer code has been input, the customer information managing section 130 searches the individual purchase history 111 by using the received customer code, to acquire information about the commodities purchased in the past.

[Step S15] The customer information managing section 130 determines whether or not applicable information has been found. If such information is found, the process proceeds to Step S19; if not, the process proceeds to Step S16. Also in the case where no customer code has been input, the process proceeds to Step S16.

[Step S16] The customer information managing section 130 generates a new record in the individual purchase history 111.

[Step S17] The customer information managing section 130 issues a new customer code and registers same in the record in the individual purchase history 111 generated in Step S16. Also, the customer information managing section 130 registers the generated customer code in the use information DB 117 as a new record.

[Step S18] The guidance message determining section 150 detects the generation of the customer code and retrieves a customer code notification message from the guidance message DB 118. Then, the guidance message determining section 150 inserts the customer code and the issue date in the retrieved guidance message and sends the message to the shopping cart 200. Consequently, the issued customer code is displayed on the display 204 of the shopping cart 200, making the customer informed of his/her customer code.

FIG. 17 illustrates an exemplary display of a customer code notification screen. As shown in FIG. 17, the customer code and the issue date are shown on the customer code notification screen 41. Referring again to FIG. 16, the subsequent process will be explained.

[Step S19] The customer information managing section 130 records the use start time in the record newly generated in the use information DB 117.

[Step S20] On receiving a passed rack number from the shopping cart 200, the customer information managing section 130 records the received rack number in the field "Passed Rack No." in the use information DB 117 (if a rack number is already set, the received rack number is recorded by overwriting the previous data). Also, the customer information managing section 130 records the time of reception of the passed rack number in the field "Rack Passage Time" (if a time is already set, the new reception time is recorded by overwriting the previous data).

[Step S21] The customer information managing section 130 determines whether or not payment is completed. For example, on receiving information indicative of the customer's payment from the cash register 21, the customer information managing section 130 judges that payment is completed. If payment is completed, the process is ended; if not, the process proceeds to Step S22.

[Step S22] The customer stop judging section 140 determines whether or not the shopping cart 200 used by the customer has been stopped for a predetermined time (the set time in the use information DB 117). Specifically, the customer stop judging section 140 monitors the rack passage time in the use information DB 117 and, if the difference between the current time and the rack passage time exceeds the set time, judges that the shopping cart has been stopped for the predetermined time. If the shopping cart has been stopped for the predetermined time, the process proceeds to Step S31; if the stop time is shorter than the predetermined time, the process proceeds to Step S20.

Figure 18:
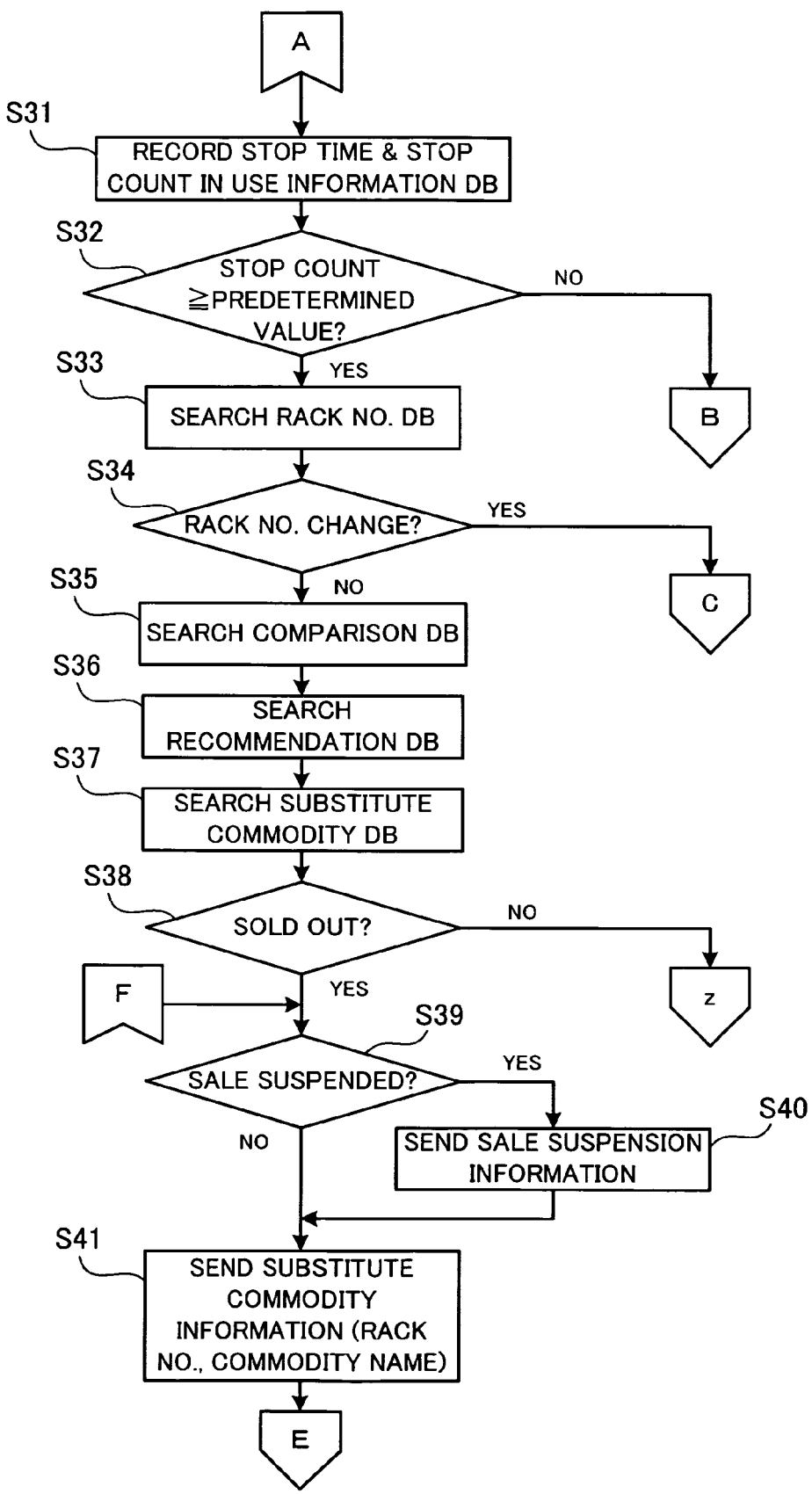
FIG. 18 is a second flowchart illustrating the process of the store server.

FIG. 18 is a second flowchart illustrating the process of the store server. In the following, the process shown in FIG. 18 will be explained in order of step number.

[Step S31] The customer stop judging section 140 records the stop time and stop count in the use information DB 117. Specifically, for the stop count, "1" is added to the previous stop count.

[Step S32] The guidance message determining section 150 determines whether or not the count of stops in front of the same rack has reached a predetermined value (the value of the set count in the use information DB 117). If the stop count is equal to or greater than the predetermined value, the process proceeds to Step S33; if the stop count is smaller than the predetermined value, the process proceeds to Step S61.

[Step S33] The guidance message determining section 150 searches the rack number DB 112 by using the stayed rack number, to acquire an applicable record.

[Step S34] The guidance message determining section 150 determines whether or not there has been a change of commodities displayed on the stayed rack (whether or not the rack number of a certain displayed commodity has changed). Specifically, if removed commodity information such as previously displayed commodity code is set in the record associated with the stayed rack number, the guidance message determining section 150 judges that there has been a change of rack number. If a change of rack number is detected, the process proceeds to Step S66; if not, the process proceeds to Step S35.

[Step S35] The guidance message determining section 150 searches the comparison DB 114 by using the rack number of the rack where the customer has stopped.

[Step S36] The guidance message determining section 150 searches the recommendation DB 116 for a commodity whose recommendation rank is highest among the commodities in stock, and acquires the corresponding record.

[Step S37] Using the commodity code of the commodity displayed on the rack where the customer has stopped, the guidance message determining section 150 searches the substitute commodity DB 113 to acquire an applicable record.

[Step S38] The guidance message determining section 150 checks the number of articles in stock set in the record acquired in Step S36, to determine whether or not the commodity on the rack is sold out (the number of articles in stock is "0"). If the commodity is sold out, the process proceeds to Step S39; if the commodity is in stock, the process proceeds to Step S51.

[Step S39] The guidance message determining section 150 looks up the sale suspension flag in the record acquired in Step S37, to determine whether or not the sale of the corresponding commodity is suspended. If the sale is suspended, the process proceeds to Step S40; if not, the process proceeds to Step S41.

[Step S40] The guidance message determining section 150 sends sale suspension information to the shopping cart 200. Specifically, the guidance message determining section 150 retrieves sale suspension information from the guidance message DB 118, inserts necessary data in the retrieved information, and transmits the information to the shopping cart 200. Thereupon, the sale suspension information is displayed on the display 204 of the shopping cart 200.

FIG. 19 illustrates an example of a sale suspension information display screen. As illustrated, on the sale suspension information display screen 42 is shown a sale suspension guidance message including the name of the commodity of which the sale has been suspended and the sale suspension date (acquired from DB information on commodities, not shown in FIG. 7).

In the example of FIG. 19, the customer has stopped in front of the rack where beef from the U.S.A. had been displayed. Looking up the substitute commodity DB 113 shows that the sale suspension flag for U.S. beef (commodity code: "300112325") is "1", and therefore, the sale suspension guidance message is transmitted.

Referring again to FIG. 18, the subsequent process will be explained.

[Step S41] The guidance message determining section 150 sends substitute commodity information to the shopping cart 200. Specifically, the guidance message determining section 150 retrieves a message for the substitute commodity information from the guidance message DB 118 and inserts, in the retrieved message, information about the substitute commodity specified by the substitute commodity code in the record acquired in Step S37. Then, the guidance message determining section 150 transmits the message to the shopping cart 200 as the substitute commodity information, whereupon the substitute commodity information is displayed on the display 204 of the shopping cart 200.

FIG. 20 illustrates an example of a substitute commodity information display screen. A message suggesting a substitute commodity is shown on the substitute commodity information display screen 43. In FIG. 20, the price of the substitute commodity (acquired from DB information on commodities, not shown in FIG. 7) is shown besides the customer code and the rack number.

In the example of FIG. 20, the customer has stopped in front of the rack where U.S. beef (commodity code: "300112325") is displayed. Looking up the substitute commodity DB 113 shows that Australian beef (commodity code: "200112325") is set as the substitute commodity, and therefore, a guidance message suggesting Australian beef as a substitute is displayed.

Figure 21:
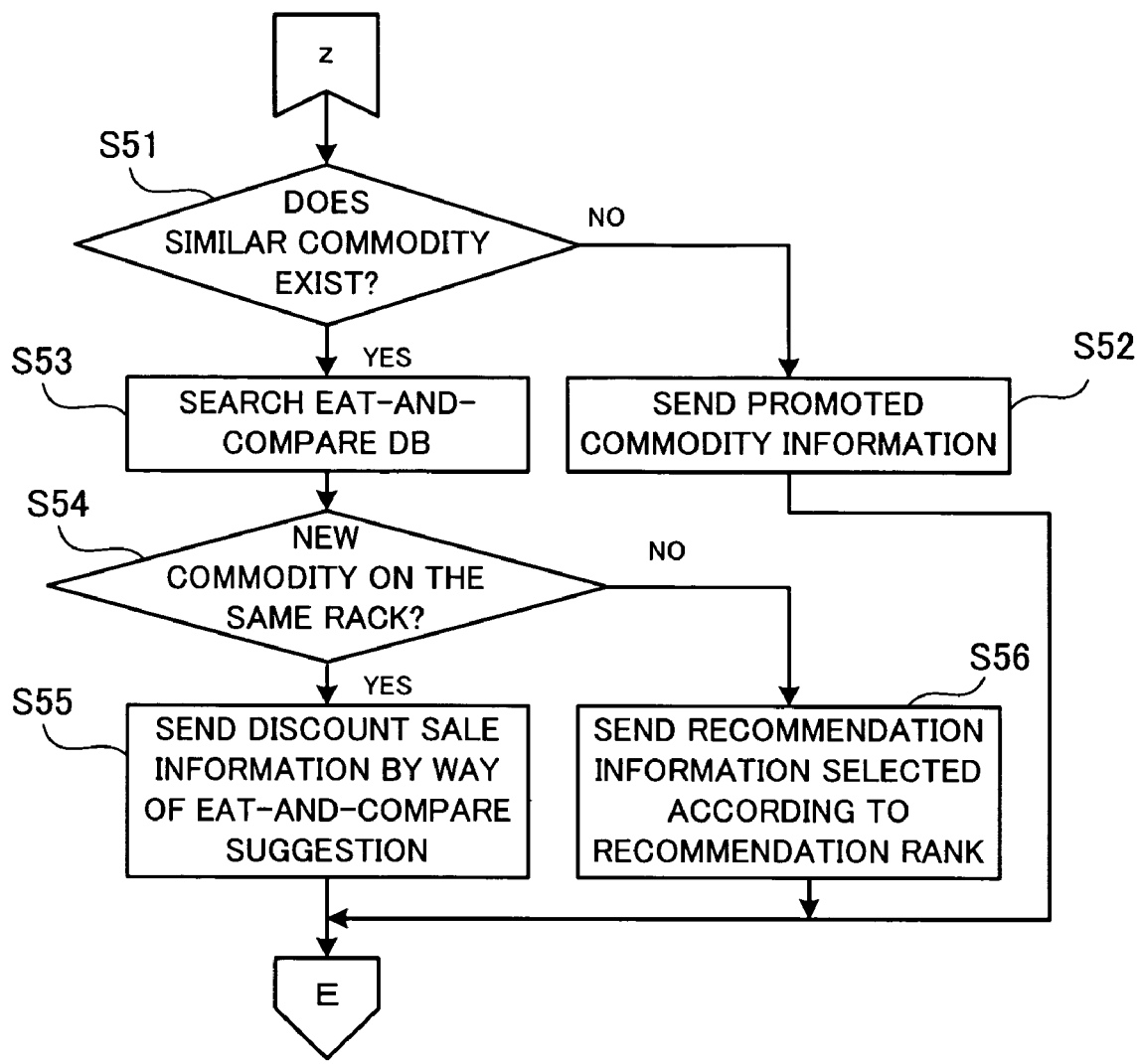
FIG. 21 is a third flowchart illustrating the process of the store server.

FIG. 21 is a third flowchart illustrating the process of the store server. In the following, the process shown in FIG. 21 will be explained in order of step number.

[Step S51] The guidance message determining section 150 determines whether or not there is a similar commodity. If a similar commodity exists, the process proceeds to Step S53; if not, the process proceeds to Step S52.

[Step S52] The guidance message determining section 150 sends promoted commodity information. Specifically, the guidance message determining section 150 retrieves a promoted commodity guidance message from the guidance message DB 118 and inserts, in the retrieved message, information about the commodity of the highest sale promotion rank in the comparison DB 114. Then, the guidance message determining section 150 transmits the promoted commodity guidance message to the shopping cart 200, whereupon a promoted commodity information screen is displayed on the display 204 of the shopping cart 200. Subsequently, the process proceeds to Step S20.

FIG. 22 illustrates an example of the promoted commodity information screen. A promoted commodity guidance message is shown on the promoted commodity information screen 44. In the example of FIG. 22, the price of the substitute commodity (acquired from DB information on commodities, not shown in FIG. 7) is shown besides the customer code and the rack number.

In the case where the customer has stopped in front of the rack where U.S. beef is displayed, for example, the comparison DB 114 is looked up but no similar commodity is found. Accordingly, a guidance message suggesting Australian beef with the highest sale promotion rank is displayed.

Referring again to FIG. 21, the subsequent process will be explained.

[Step S53] Using the commodity code, the guidance message determining section 150 searches the eat-and-compare DB 115 to acquire an applicable record.

[Step S54] The guidance message determining section 150 determines whether or not there is a new commodity displayed on the same rack. If there is a new commodity, the process proceeds to Step S55; if not, the process proceeds to Step S56.

[Step S55] The guidance message determining section 150 sends discount sale information by way of eat-and-compare suggestion. Specifically, the guidance message determining section 150 retrieves an eat-and-compare information guidance message from the guidance message DB 118 and inserts, in the retrieved message, information about the new commodity on the same rack, stored in the eat-and-compare DB 115. Then, the guidance message determining section 150 transmits the eat-and-compare information message to the shopping cart 200, whereupon an eat-and-compare information screen is displayed on the display 204 of the shopping cart 200. Subsequently, the process proceeds to Step S20.

FIG. 23 illustrates an exemplary display of the eat-and-compare information screen. A guidance message indicating commodities which the customer is recommended to eat and compare is shown on the eat-and-compare information screen 45. In the example of FIG. 23, the commodities recommended to eat and compare (in the example of FIG. 23, home-produced beef and Australian beef) and a recipe for cooking the commodities (acquired from DB information on commodities, not shown in FIG. 7) are shown besides the customer code. A message is also included which informs the customer that a discount is allowed if the customer buys both of the eat-and-compare commodities.

In the case where the customer has stopped in front of the rack displaying home-produced beef, for example, the eat-and-compare DB 115 is looked up and Australian beef is found as an eat-and-compare commodity with the same rack number; therefore, a suggestion for eating and comparing Australian beef and home-produced beef is offered, as shown in FIG. 23.

Referring again to FIG. 21, the subsequent process will be explained.

[Step S56] The guidance message determining section 150 sends recommendation information in accordance with recommendation ranks. Specifically, the guidance message determining section 150 selects a commodity of the highest recommendation rank from among the commodities the information on which can be presented to customers. Subsequently, the guidance message determining section 150 retrieves a message for recommendation information from the guidance message DB 118 and inserts the information on the recommended commodity in the retrieved message. The guidance message determining section 150 then transmits the recommendation information message to the shopping cart 200, whereupon the recommendation information is displayed on the display 204 of the shopping cart 200. Subsequently, the process proceeds to Step S20.

FIG. 24 illustrates an example of a recommendation information display screen. As illustrated, information on the recommended commodity is shown on the recommendation information display screen 46. In the example of FIG. 24, the price of the substitute commodity and a recommendatory message (acquired from DB information on commodities, not shown in FIG. 7) are shown besides the customer code and the rack number.

Figure 25:
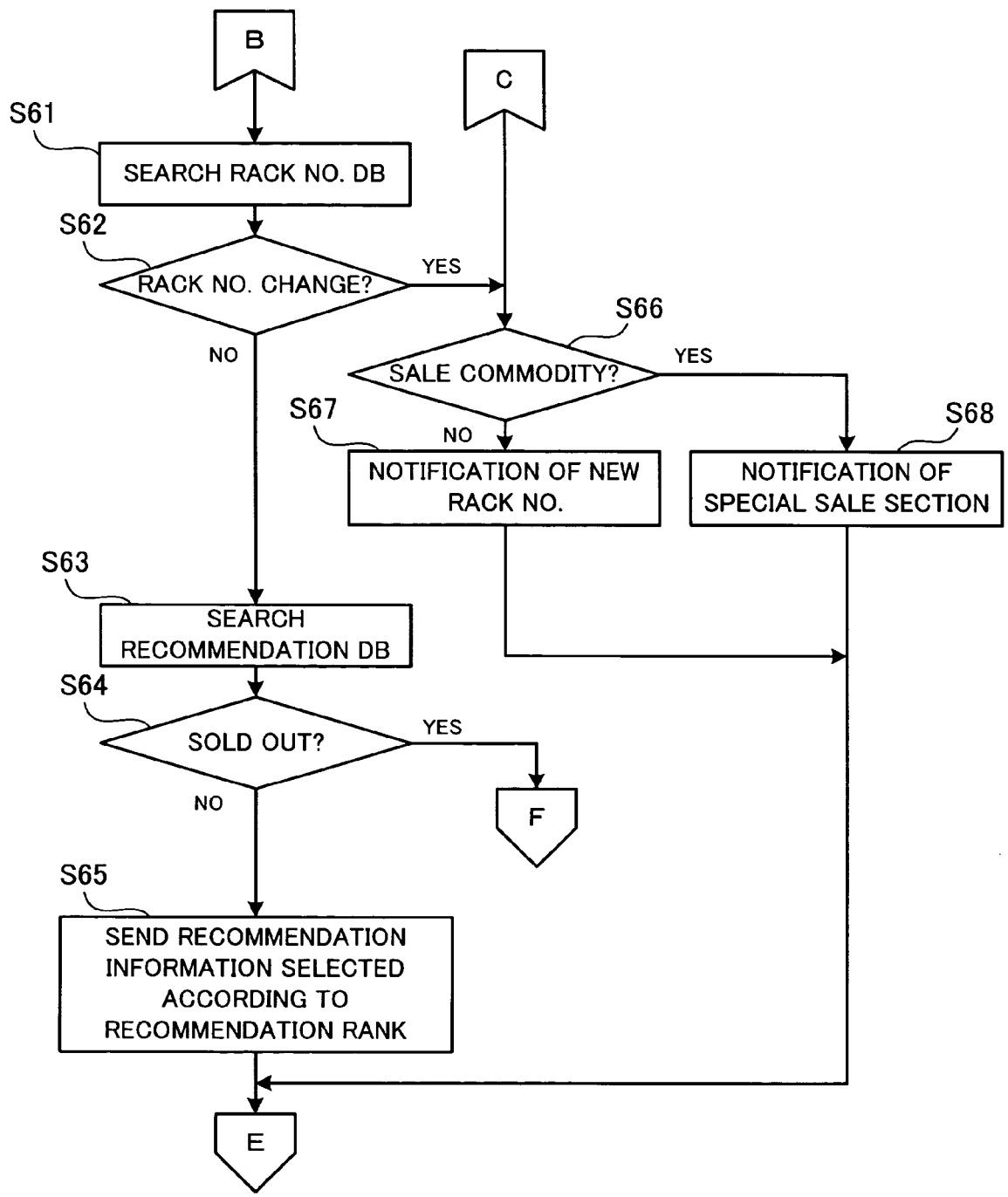
FIG. 25 is a fourth flowchart illustrating the process of the store server.

FIG. 25 is a fourth flowchart illustrating the process of the store server. In the following, the process shown in FIG. 25 will be explained in order of step number.

[Step S61] The guidance message determining section 150 searches the rack number DB 112 by using the rack number of the rack where the customer has stopped, to acquire an applicable record.

[Step S62] The guidance message determining section 150 determines whether or not there has been a change of rack number. If there has been a change of rack number, the process proceeds to Step S66; if not, the process proceeds to Step S63.

[Step S63] If there has been no change of rack number, the guidance message determining section 150 searches the recommendation DB 116 by using the rack number of the rack where the customer has stopped, to acquire an applicable record.

[Step S64] The guidance message determining section 150 checks the number of articles in stock set in the record acquired in Step S63, to determine whether or not the commodity on the rack is sold out (the number of articles in stock is "0"). If the commodity is sold out, the process proceeds to Step S39; if the commodity is in stock, the process proceeds to Step S65.

[Step S65] The guidance message determining section 150 sends recommendation information in accordance with recommendation ranks. Specifically, the guidance message determining section 150 selects a commodity of the highest recommendation rank from among the commodities the information on which can be presented to customers. Subsequently, the guidance message determining section 150 retrieves the message for recommendation information from the guidance message DB 118 and inserts the information on the recommended commodity in the retrieved message. The guidance message determining section 150 then transmits the recommendation information message to the shopping cart 200, whereupon the recommendation information is displayed on the display 204 of the shopping cart 200 (example of the recommendation information display screen is shown in FIG. 24). Subsequently, the process proceeds to Step S20.

[Step S66] If it is judged in Step S34 or S62 that there has been a change of rack number, the guidance message determining section 150 looks up the special sale flag in the record acquired from the rack number DB 112, to determine whether or not the commodity is a sale commodity. If the commodity is a sale commodity, the process proceeds to Step S68; if not, the process proceeds to Step S67.

[Step S67] The guidance message determining section 150 sends a new rack number notification. Specifically, the guidance message determining section 150 retrieves a message for new rack number notification from the guidance message DB 118 and inserts, in the retrieved message, the previously displayed commodity code, special sale flag, new floor code and new rack number set in the record acquired from the rack number DB 112. Then, the guidance message determining section 150 transmits the new rack number notification message to the shopping cart 200, whereupon the new rack number is displayed on the display of the shopping cart 200. Subsequently, the process proceeds to Step S20.

FIG. 26 illustrates an example of a new rack number display screen. As illustrated, information about the commodity code of the removed commodity, new floor, new rack number, etc. is shown on the new rack number display screen 47.

Referring again to FIG. 25, the subsequent process will be explained.

[Step S68] The guidance message determining section 150 sends information about the sale commodity section.

Specifically, the guidance message determining section 150 retrieves a message for notifying sale commodity's new rack number from the guidance message DB 118 and inserts, in the retrieved message, the previously displayed commodity code, special sale flag, new floor code and new rack number set in the record acquired from the rack number DB 112. Then, the guidance message determining section 150 transmits the message notifying the sale commodity's new rack number to the shopping cart 200. Subsequently, the process proceeds to Step S20.

FIG. 27 illustrates an example of a sale commodity's new rack number display screen. As illustrated, information about the commodity code of the removed commodity, new floor, new rack number, etc. is shown on the sale commodity's new rack number display screen 48.

In this manner, by inferring the cause or the like of the customer's trouble from the position where the customer has stopped, it is possible to present an appropriate guidance message to the customer. Accordingly, an appropriate message matching the situation the customer is experiencing can be communicated to the customer.

In the above instance, the IC tag is attached to a commodity rack and the sensor is attached to the shopping cart 200 or the shopping basket 23. Alternatively, the IC tag may be attached to the shopping cart or basket and the sensor may be attached to a commodity rack.

Also, in the above instance, the customer's position (position of the nearby rack) is detected by the IC tag and the sensor but may be detected by other methods. For example, a radio wave may be transmitted from the shopping cart 200 or the shopping basket 23 to be received by a plurality of base stations, and based on the difference of reception times at which the radio wave was received by the base stations, the distances to the shopping cart 200 from the base stations may be calculated to locate the shopping cart 200.

Further, in the above instance, the judgment as to the customer's stop and the determination of guidance messages are executed by the store server 100, but these functions may be incorporated into the shopping cart 200. In this case, a variety of information stored in the information storing section 110 shown in FIG. 7 may be previously stored in the nonvolatile recording medium 213 in the management device 210 of the shopping cart 200. Information about the completion of payment and the acquisition of customer code may be transmitted from the store server 100 to the shopping cart 200 at suitable timing.

The processing functions described above can be performed by a computer. In this case, a program is prepared in which are described processes for performing the functions of the store server 100 or the management device 210. The program is executed by a computer, whereupon the aforementioned processing functions are accomplished by the computer. The program describing the required processes may be recorded on a computer-readable recording medium. The computer-readable recording medium includes a magnetic recording device, an optical disc, a magneto-optical recording medium, a semiconductor memory, etc. The magnetic recording device may be a hard disk drive (HDD), a flexible disk (FD), a magnetic tape or the like. As the optical disc, a DVD (Digital Versatile Disc), a DVD-RAM (Random Access Memory), a CD-ROM (Compact Disc Read Only Memory), a CD-R (Recordable)/RW (ReWritable) or the like may be used. The magneto-optical recording medium includes an MO (Magneto-Optical disk) etc.

To market the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer loads the program from its storage device and performs processes in accordance with the program. The computer may load the program directly from the portable recording medium to perform processes in accordance with the program. Also, as the program is transferred from the server computer, the computer may sequentially perform processes in accordance with the received program.

As described above, according to the present invention, the customer's stop is detected and a guidance message matching the commodity displayed on the rack near the customer's stop position is transmitted. Accordingly, in cases where the customer is in two minds whether to buy a commodity because of shortage of information or has difficulty in finding a commodity because the commodity has been removed from the previous rack, appropriate commodity information can be presented to the customer as a guidance message.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A commodity information provision method for providing a customer with commodity information, comprising the steps of:

periodically acquiring, by customer position information acquiring means, position information from a position detection device which the customer carries when shopping;

judging by stop judging means whether the customer has stopped or not in accordance with the position information;

determining, by message determining means in response to a stop of the customer, a guidance message to be presented to the customer in accordance with a commodity displayed on a rack near the stop position; and transmitting, by message transmitting means, the determined guidance message to the position detection device, and wherein said message determining means keeps count of stops of the customer at an identical place and determines the guidance message in accordance with the stop count.

2. A commodity information provision method for providing a customer with commodity information, comprising the steps of:

periodically acquiring, by customer position information acquiring means, position information from a position detection device which the customer carries when shopping;

judging by stop judging means whether the customer has stopped or not in accordance with the position information;

determining, by message determining means in response to a stop of the customer, a guidance message to be presented to the customer in accordance with a commodity displayed on a rack near the stop position; and transmitting, by message transmitting means, the determined guidance message to the position detection device, and wherein said message determining means has a rack number database in which is registered information indicative of racks to which respective commodities previously displayed on certain racks have been removed, and said message determining means looks up the rack number database and, if a commodity has been removed from a rack near the customer's stop position to a different rack, determines information indicative of the rack to which the previously displayed commodity has been removed as the guidance message.

3. A commodity information provision method for providing a customer with commodity information, comprising the steps of:

periodically acquiring, by customer position information acquiring means, position information from a position detection device which the customer carries when shopping;

judging by stop judging means whether the customer has stopped or not in accordance with the position information;

determining, by message determining means in response to a stop of the customer, a guidance message to be presented to the customer in accordance with a commodity displayed on a rack near the stop position; and transmitting, by message transmitting means, the determined guidance message to the position detection device, and wherein said message determining means has a substitute commodity database in which is registered information indicative of substitute commodities as substitutes for commodities of which the sale has been suspended, and said message determining means looks up the substitute commodity database and, if the sale of a commodity previously displayed on a rack near the customer's stop position has been suspended, determines information indicative of a corresponding substitute commodity as the guidance message.

4. A commodity information provision method for providing a customer with commodity information, comprising the steps of:

periodically acquiring, by customer position information acquiring means, position information from a position detection device which the customer carries when shopping;

judging by stop judging means whether the customer has stopped or not in accordance with the position information;

determining, by message determining means in response to a stop of the customer, a guidance message to be presented to the customer in accordance with a commodity displayed on a rack near the stop position; and transmitting, by message transmitting means, the determined guidance message to the position detection device, and wherein said message determining means has an eat-and-compare database in which is registered information indicative of relations between new commodities and other commodities which the customer is recommended to eat and compare, and said message determining means looks up the eat-and-compare database and, if the new commodity is displayed on a rack near the customer's stop position, determines information suggesting eating and comparing with the other commodity as the guidance message.

5. A commodity information provision method for providing a customer with commodity information, comprising the steps of:

periodically acquiring, by customer position information acquiring means, position information from a position detection device which the customer carries when shopping;

judging by stop judging means whether the customer has stopped or not in accordance with the position information;

determining, by message determining means in response to a stop of the customer, a guidance message to be presented to the customer in accordance with a commodity displayed on a rack near the stop position; and transmitting, by message transmitting means, the determined guidance message to the position detection device, and wherein said message determining means has a recommendation database in which is registered information indicative of commodities which a store recommends the customer to purchase, and said message determining means looks up the recommendation database and determines, as the guidance message, information suggesting eating and comparing a plurality of commodities displayed on a rack near the customer's stop position.

6. A commodity information provision apparatus providing a customer with commodity information, comprising:

customer position information acquiring means for periodically acquiring position information from a position detection device which the customer carries when shopping;

stop judging means for judging whether the customer has stopped or not in accordance with the position information;

message determining means, responsive to a stop of the customer, for determining a guidance message to be presented to the customer in accordance with a commodity displayed on a rack near the stop position; and message transmitting means for transmitting the determined guidance message to the position detection device, and wherein said message determining means keeps count of stops of the customer at an identical place and determines the guidance message in accordance with the stop count.

7. A computer-readable recording medium recording a commodity information provision program for providing a customer with commodity information, wherein the commodity information provision program causes the computer to function as:

customer position information acquiring means for periodically acquiring position information from a position detection device which the customer carries when shopping;

stop judging means for judging whether the customer has stopped or not in accordance with the position information;

message determining means, responsive to a stop of the customer, for determining a guidance message to be presented to the customer in accordance with a commodity displayed on a rack near the stop position; and message transmitting means for transmitting the determined guidance message to the position detection device, and wherein said message determining means keeps count of stops of the customer at an identical place and determines the guidance message in accordance with the stop count.

* * * * *